United States Patent [19]
McDermott

[11] Patent Number: 5,127,507
[45] Date of Patent: Jul. 7, 1992

[54] OFFSET ASSEMBLY FOR A GRAVITY CONVEYOR CHUTE

[75] Inventor: Daniel R. McDermott, Clinton, Md.

[73] Assignee: Trihard, S.A., Luxembourg

[21] Appl. No.: 607,633

[22] Filed: Oct. 31, 1990

Related U.S. Application Data

[63] Continuation of Ser. No. 360,593, Jun. 2, 1989, abandoned.

[51] Int. Cl.⁵ .............................................. B65G 11/00
[52] U.S. Cl. .................................. 193/2 R; 193/2 A; 193/17
[58] Field of Search ................. 193/2 A, 2 R, 33, 34, 193/17, 8, 4, 16, 22; 198/641

[56] References Cited

U.S. PATENT DOCUMENTS

| | | | |
|---|---|---|---|
| D. 296,834 | 7/1988 | McDermott | D34/28 |
| 600,835 | 3/1898 | Stuckel | 183/16 |
| 779,205 | 1/1905 | Campbell | 193/16 |
| 892,550 | 7/1908 | Ream | 193/2 R |
| 1,510,288 | 9/1924 | Malone | 193/34 |
| 1,820,262 | 8/1931 | Wilkinson | 193/34 |
| 1,975,805 | 3/1931 | Horn | 193/17 |
| 1,978,014 | 10/1934 | Dion et al. | 193/2 R |
| 2,975,805 | 3/1961 | Horn | 193/17 |
| 3,124,229 | 3/1964 | Rutten | 193/17 |
| 4,339,024 | 7/1982 | Wollin | 193/34 |
| 4,368,813 | 1/1983 | Mailliet | 193/16 |
| 4,458,800 | 7/1984 | Christenson | 193/16 X |
| 4,640,403 | 2/1987 | McDermott | 193/34 |

OTHER PUBLICATIONS

6901 Spring Road, Brandywine, Md. 20613 (8 pages) (Brochure).
Chutes International, Inc. (8 pages) (Brochure).

*Primary Examiner*—Robert P. Olszewski
*Assistant Examiner*—Cheryl L. Gastineau
*Attorney, Agent, or Firm*—Griffin, Brannigan & Butler

[57] ABSTRACT

An offset assembly (20) for a gravity-conveyor chute (10) includes offset upstream and downstream tubes (18 and 22) which are hingedly attached one to the other, with an upstream end opening (66) of the offset downstream tube being significantly larger than outer dimensions of a downstream end (44) of the offset upstream tube. The offset upstream and downstream tubes are rectangular in cross section with each including hinge mounts which extend laterally, outwardly, from outside surfaces of panels thereof. The downstream end of the offset upstream tube terminates in a plane which forms an angle with an axis of elongation of the offset upstream tube. The offset upstream tube has a side opening with a ledge and a door thereat.

15 Claims, 2 Drawing Sheets

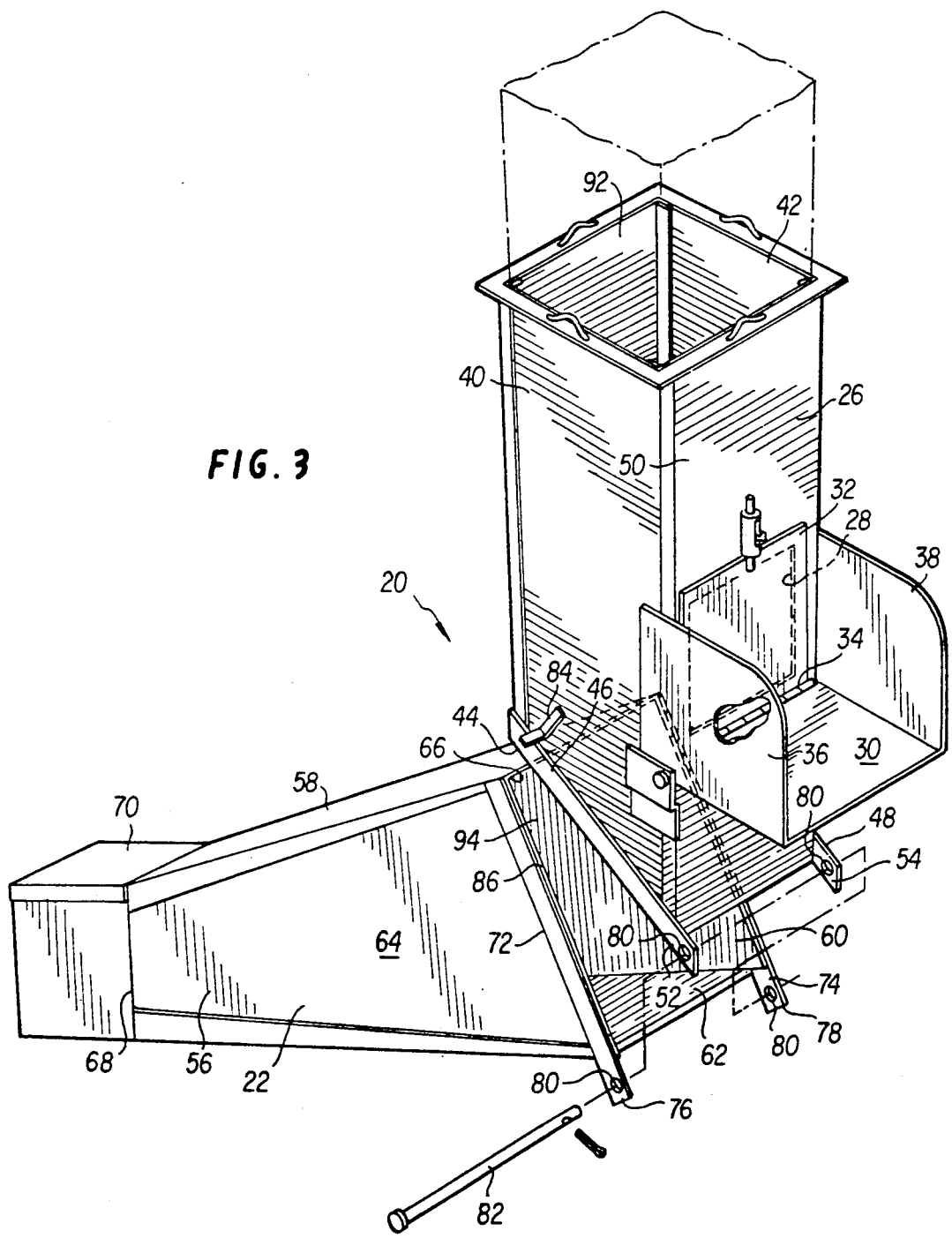

OFFSET ASSEMBLY FOR A GRAVITY CONVEYOR CHUTE

This application is a continuation of U.S. application Ser. No. 07/360,593, filed Jun. 2, 1989, now abandoned.

BACKGROUND OF THE INVENTION

This invention relates generally to the art of gravity conveyors, or chutes, which are often used for dropping trash from tall construction sites, such as buildings, in a controlled manner.

U.S. Pat. No. 4,640,403 to McDermott describes a rectangular-in-cross-section gravity-conveyor chute section having a side opening in a front panel thereof with a rotatable door/ledge assembly mounted thereat. The door/ledge assembly includes a ledge which can be moved between a closed position, flat against the front panel, and a laterally-extending position in which it forms a ledge below the side opening. U.S. Pat. No. D296,834 to McDermott also depicts a gravity-conveyor chute section with a side opening and rotatable door/ledge assembly, but in addition thereto, depicts a bottom, offset, section in FIG. 15 for changing the direction of items falling through a bore of the chute. The offset section disclosed in McDermott U.S. Pat. No. D296,834 includes a vertical upstream portion which is attached to a downstream, offset, portion. In this regard, both the upstream portion and the downstream portion form bores which are serially connected, but the bore of the downstream, offset, portion is at an angle to that of the upstream portion. The reason such an offset assembly is often necessary for a gravity conveyor chute is to discharge materials away from buildings on which the chutes are mounted. Thus, it is an object of this invention to provide an offset assembly for a gravity-conveyor chute which can be mounted at the lower end of the gravity-conveyor chute for discharging materials from the chute away from a building on which the chute is mounted.

A difficulty with most prior-art offset assemblies for gravity-conveyor chutes is that the positions of their downstream openings are fixed relative to vertical bores of the chutes. In this respect, it is not always desirable to have materials exiting from chutes at fixed distances from buildings, but rather, it is desirable to be able to adjust the positions of downstream openings relative to vertical sections of chutes. Therefore, it is an object of this invention to provide an offset assembly for a gravity-conveyor chute for which the position of a downstream opening can be adjusted.

It is a further object of this invention to provide an adjustable offset assembly for a gravity-conveyor chute which is durable, easy to mount, and relatively inexpensive to construct.

Further, it is an object of this invention to provide such an adjustable offset assembly for a gravity-conveyor chute which can be easily adjusted for changing the position of a downstream opening thereof.

SUMMARY

According to principles of this invention, an offset assembly for a gravity-conveyor chute comprises offset upstream and downstream tubes which are hingedly attached to one another in such a manner that a downstream end opening of the offset upstream tube remains aligned with an upstream end opening of the offset downstream tube so that the bores of these two sections are aligned whereby items serially fall through the bores. This allows the lateral position of a downstream end opening of the offset downstream tube to be changed relative to the bore of the offset upstream tube. The upstream end opening of the offset downstream tube is bigger in cross section than the downstream end opening of the offset upstream tube so that the downstream end of the offset upstream tube remains in the upstream end opening of the offset downstream tube while the offset downstream tube is being pivoted. Both the offset upstream tube and the offset downstream tube include engaging hinge members which are laterally, outwardly, spaced from side walls thereof and the downstream end of the offset downstream tube is terminated on a plane at an angle to its axis of elongation. There is a side opening in the offset upstream tube and the offset upstream tube includes a door/ledge assembly. Both offset upstream and downstream tubes are rectangular in cross section.

BRIEF DESCRIPTION THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 3 is a front exploded isometric view of an offset assembly of this invention.

DESCRIPTION OF THE PREFERRED EMBODIMENT

Figure 1:
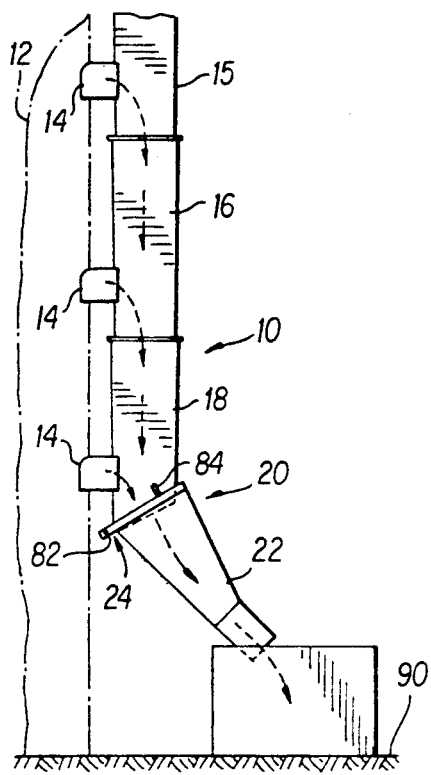
FIG. 1 is a side view of a building having a gravity conveyor chute mounted thereon with an offset assembly of this invention.

Referring now to the drawings, a gravity conveyor chute 10 is affixed to a building 12 having ledges 14 extending from side openings 28 in sections 15 and 16 and tube 18 of the gravity conveyor chute 10. The sections 15 and 16 are tubularly shaped with a downstream end of the upstream section 15 telescoping into an upstream end of the downstream section 16. The sections 15 and 16 can be basically of a type described in U.S. Pat. No. 4,640,403 to McDermott. However, the tube 18 is part of an offset assembly 20 of this invention. In this respect, the offset assembly 20 comprises an offset upstream tube 18 and an offset downstream tube 22 coupled to the offset upstream tube 18 by means of a hinge assembly 24. The offset assembly 20 is shown in more detail in FIGS. 2 and 3. The offset upstream tube 18 comprises mainly a rectangular-in-cross section tube 26 having a side opening 28 therein with a pivotal ledge 30 and a lockable door 32 mounted at the side opening 28. Both the ledge 30 and the door 32 can be pivoted about hinges approximately at 34 to be in a laterally extended positions or to be in closed positions covering the side opening 28. When the ledge 30 is in a laterally extended position, the door 32 can either be in a closed position, or in a laterally extended position. When the ledge 30 is in a closed position, side supports 36 and 38 slide along side panels 40 and 42 of the tube 26.

The tube 26 is essentially the same as tubes of the upstream sections 15 and 16, with the exception that a downstream end 44 is terminated at an angle of about 60 degrees to an axis of elongation of the tube 26, which means that when the offset upstream tube 18 is approximately in a vertical position as shown in FIG. 1, the downstream end 44 of the tube 26 forms an angle of approximately 30 degrees with a horizontal plane. Welded to the side panels 40 and 42 at the downstream end 44 are offset upstream tube hinge bars 46 and 48 which protrude beyond a front panel 50 at 52 and 54. These hinge bars 46 and 48 are also at a 60 degree angle to the axis of elongation of the tube 26.

The offset downstream tube 22 is constructed of sheet steel panels 56, 58, 60, and 62 arranged to form a rectangular funnel 64 with an upstream open end 66. At a downstream end 68 of the funnel 64 is a short rectangular tube 70, having about the same size as the tube 26, for further guiding material passing through the funnel 64.

Figure 2:
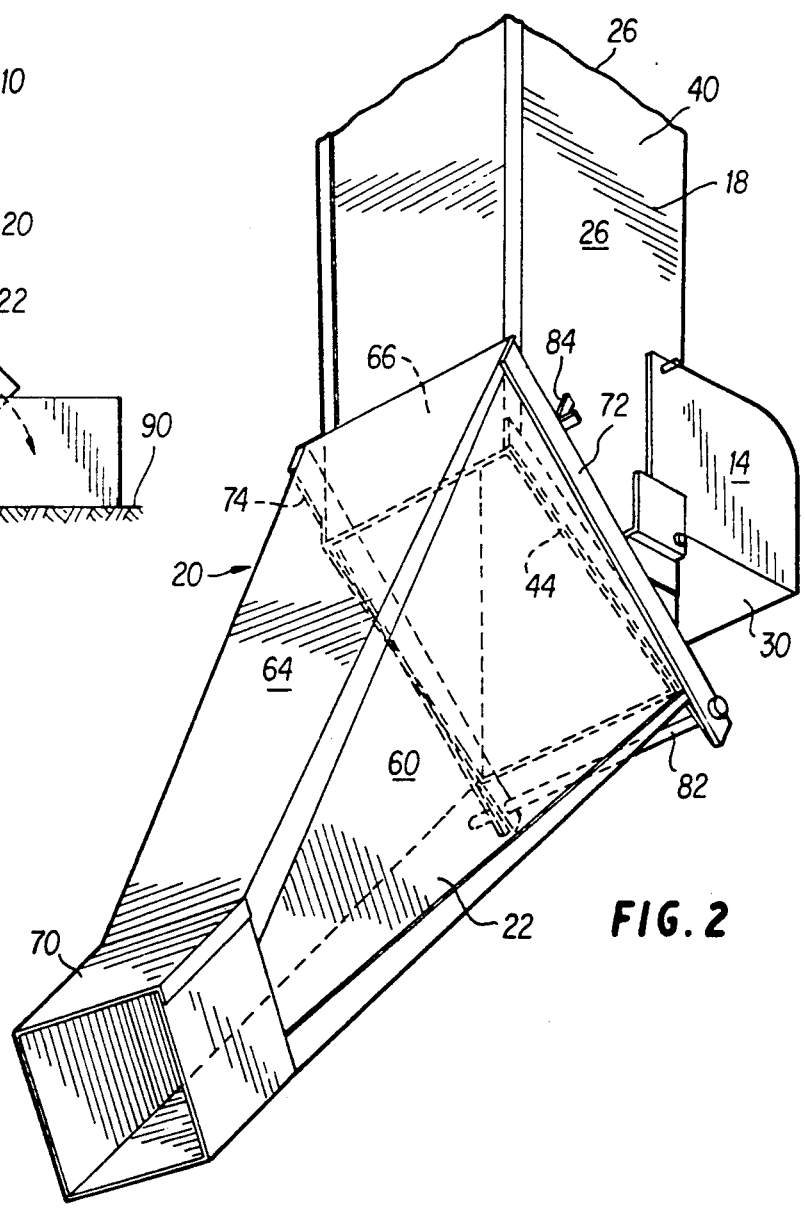
FIG. 2 is a rear isometric view of an offset this invention.

As can be seen in FIG. 2, the upstream, open end 66 of the funnel 64 is quite a bit larger than the downstream end 44 of the tube 26 of the offset upstream tube 18. The funnel 64 also includes reenforced hinge bars 72 and 74 welded to outer surfaces of the panels 56 and 60 at the upstream open end 66 to extend beyond the panel 62 at extensions 76 and 78.

The extensions 52, 54, 76 and 78 of the respective hinge bars 46, 48, 72 and 74 all have round holes 80 therein for receiving a round hinge shaft 82 with the hinge extensions 52 and 54 being inside the hinge extensions 76 and 78. The hinge shaft 82 is held in position by a pin or the like. When the hinge extensions 52 and 54 are thusly coupled to the hinge extension 76 and 78, with the offset upstream tube 18 being attached to the building 12 as is shown in FIG. 1, the offset downstream tube 22 can pivot about the shaft 82. The offset downstream tube 22 can be held in a fixed position relative to the offset upstream tube 18 by brackets 84 welded respectively between the sides 40 and 42 of the offset upstream tube 18 and upper surfaces 86 of the hinge bars 72 and 74. In this respect, the brackets 84 could be welded at other places as well in order to achieve a fixed relationship between the offset upstream tube 18 and the offset downstream tube 22.

In operation, the offset upstream tube 18 of the offset assembly 20 is fixedly mounted at the side of the building 12 with its ledge 14 and side opening 28 positioned at a window, door, or other opening, of a lower floor of the building 12. The upstream sections 15, 16 etc. are telescoped sequentially into upstream ends of lower sections with their ledges 14 positioned at openings of respective floors in the building 12. Normally, when it is first mounted, the offset downstream tube 22 of the offset assembly 20 is not coupled to the offset upstream tube 18, but rather is added thereto after the offset upstream tube 18 is in position. In this respect, once the offset upstream tube 18 is in position, the offset downstream tube 22 is positioned so that the hinge extensions 76 and 78 are adjacent outside surfaces of the hinge extensions 52 and 54, with the holes 80 thereof aligned. The hinge shaft 82 is passed through the holes 80 and locked in position by a pin. The offset downstream tube 22 is then pivoted on the shaft 82 until it is in a proper position for guiding materials dropped into the gravity conveyor chute 10 into trucks, trollies, or other containers 88 located on the ground 90. In this respect, it might be desirable to adjust the offset downstream tube 22 to deposit material passing through the gravity conveyor chute 10 at a driveway, or road, where trucks can be positioned. Once the offset downstream tube 22 is in a desirable position, the L brackets 84 are welded between the offset upstream tube 18 and the offset downstream tube 22 to achieve a fixed relationship therebetween. If it is desirable to change this relationship, a welding torch is used to remove the brackets and reposition them at second positions.

The offset assembly 20 is constructed entirely of steel, with the panels of the offset upstream tube 18 and the offset downstream tube 22 being formed sheet steel. It will be appreciated by those of ordinary skill in the art that the panel 62 of the offset downstream tube 22 will receive the full brunt of items falling through the gravity conveyor chute 10 and it is therefore necessary that panel 62 be of a higher gage steel plate than the other panels. In this respect, most of the panels are 3/16 inch thick steel whereas the panel 62 is $\frac{1}{4}$ inch steel.

It should be appreciated by those of ordinary skill in the art that the thickened hinged bars 46, 48, 72, and 74 provide a pivotal connection between the offset upstream tube 18 and the offset downstream tube 22 which is laterally spaced from outer surfaces of the tube 26 and the funnel 64 which allows the enlarged upstream open end 66 of the funnel 64 to "swallow" the downstream end 44 of the tube 26 to ensure that a bore 92 of the tube 26 remains in registration with a bore 94 of the funnel 64. Further, by terminating the downstream end 44 of the tube 26 at an approximately 30 degree angle to the horizontal, the offset downstream tube 22 is allowed to be placed at various angles close to 90 degrees with respect to the offset upstream tube 18 while not blocking material passing between the bores 92 and 94, as can be best be seen in FIG. 2. By placing the hinge extensions 52, 54, 76 and 78 on the same side of the offset assembly 20 as the ledge 14 the offset downstream tube 22 is allowed to be adjusted over a wide range to offset material away from a building while maintaining registry between the bores 92 and 94. Further, it should be understood that the offset assembly of this invention is relatively uncomplicated to construct but yet is extremely effective and durable.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed are defined as follows:

1. An offset assembly for a gravity-conveyor chute, said offset assembly receiving material falling along said gravity conveyor chute and causing said material to change direction, said offset assembly comprising:
   an offset upstream tube for a gravity-conveyor chute section of a type which can be engaged with other conveyor chute sections to form a gravity conveyor chute, the offset upstream tube comprising a sidewall having basically a tubular shape which guides items falling through a bore thereof, said offset upstream tube having an upstream end opening at an upstream end thereof for receiving items dropped into said offset upstream and thereof for discharging said items passing through the bore of said offset upstream tube, said upstream end being engagable with an adjacent section to form said gravity conveyor chute to be longer than said offset upstream tube whereby items serially fall through the bores of said thusly engaged sections;

an offset downstream tube comprising a sidewall having basically a tubular shape which guides items falling through a bore thereof, said offset downstream tube having an upstream end opening at an upstream end thereof for receiving items dropped into said offset downstream tube from above and a downstream end opening at a downstream end thereof for discharging said items passing through the bore of said offset downstream tube;

a hinge means for engaging said upstream end of said offset downstream tube with the downstream end of said offset upstream tube to support said downstream tube from said offset upstream tube and to align the bores of these two tubes whereby items serially fall through the bores of said thusly engaged offset upstream and downstream tubes while allowing the offset downstream tube to be pivoted relative to the offset upstream tube such that the lateral position of said downstream end opening of the offset downstream tube can be changed relative to the bore of the offset upstream tube;

wherein said sidewall of said offset downstream tube is constructed of a plurality of metal plates joined at edges thereof to form substantially flat panels, with one of said panels being an impact panel positioned vertically below said bore of said offset upstream tube so that items falling from the downstream end of said offset upstream tube contact said impact panel, said impact panel being made of an impact plate of metal having a thickness gage which is greater than the thickness gage of metal plate forming other panels of said offset downstream tube to which said impact plate of metal is joined.

2. An offset assembly as in claim 1, wherein an upstream end of said offset downstream tube is substantially bigger in cross-section than a downstream end of said offset upstream tube so that the angular position of said offset downstream tube can be easily changed relative to said offset upstream tube while the downstream end of said offset upstream tube remains inside the upstream end of said offset downstream tube.

3. An offset assembly as in claim 2, wherein said downstream end of said offset upstream tube terminates on an angle substantially less than 90 degrees relative to its longitudinal axis.

4. An offset assembly as in claim 1, wherein there is a side opening in said offset upstream tube to receive material to be deposited into said gravity-conveyor chute.

5. An offset assembly as in claim 4, wherein said offset upstream tube includes a door and ledge at said side opening which are rotatable relative to the sidewall of said offset upstream tube to be moved between positions for closing said side opening and for extending laterally out from said sidewall to form a ledge for said side opening.

6. An offset assembly as in claim 5, wherein an upstream end of said offset downstream tube is substantially bigger in cross-section than a downstream end of said offset upstream tube so that the angular position of said offset downstream tube can be easily substantially changed relative to said offset upstream tube while the downstream end of said offset upstream tube remains inside the upstream end of said offset downstream tube.

7. An offset assembly as in claim 4, wherein said downstream end of said offset upstream tube terminates on an angle less than 90° relative to its longitudinal axis.

8. An offset assembly as in claim 1, wherein panels of the sidewalls forming said tubular shapes in said offset upstream and downstream tubes are flat and wherein said hinge is parallel to one flat panel forming said sidewalls.

9. An offset assembly as in claim 8 wherein said hinge means is spaced laterally outside of the sidewalls of said offset upstream tube.

10. An offset assembly as in claim 8 wherein said hinge means is spaced laterally outside of the sidewalls of said offset upstream and downstream tubes.

11. An offset assembly as in claim 2 wherein said downstream end of said offset downstream tube is approximately the same size as said downstream end of said offset upstream tube.

12. An offset assembly for a gravity-conveyor construction debris chute, said offset assembly receiving material falling along said gravity conveyor chute and causing said material to change direction, said offset assembly comprising:

an offset upstream tube for a gravity-conveyor chute section of a type which can be engaged with other conveyor chute sections to form a gravity conveyor chute, the offset upstream tube comprising a sidewall having basically a tubular shape which guides items falling through a bore thereof, said offset upstream tube having an upstream end opening at an upstream end thereof for receiving items dropped into said offset upstream tube from above and a downstream end opening at a downstream end thereof for discharging said items passing through the bore of said offset upstream tube, said upstream end being engagable with an adjacent section to form said gravity conveyor chute to be longer than said offset upstream tube whereby items serially fall through the bores of said thusly engaged sections;

an offset downstream tube comprising a sidewall having basically a tubular shape which guides items falling through a bore thereof, said offset downstream tube having an upstream end opening at an upstream end thereof for receiving items dropped into said offset downstream tube from above and a downstream end opening at a downstream end thereof for discharging said items passing through the bore of said offset downstream tube;

a support means for engaging said upstream end of said offset downstream tube with the downstream end of said offset upstream tube to support said offset downstream tube from said offset upstream tube and to align the bores of these two tubes, with the bore of said offset downstream tube being oriented at a substantial angle, but less than 90° relative to the bore of said offset upstream tube, whereby items serially fall through the bores of said thusly engaged offset upstream and downstream tubes with materials exiting from the bore of said offset upstream tube and entering the bore of said offset downstream tube contacting an impact panel of the sidewall of said offset downstream tube positioned below said offset upstream tube, said offset downstream tube being constructed of a plurality of metal plates joined at edges thereof to form substantially flat panels with said impact panel being made of an impact plate of metal having a thickness which is greater than the thickness of metal plate forming the other panels of the sidewall of said offset downstream tube to which said impact plate of metal is joined wherein said metal plate forming said impact panel of said offset downstream tube has a thickness which is at least 2 and ⅔ times as great as the general thickness of metal plate forming other panels of said offset downstream tube.

13. An offset assembly for a gravity-conveyor, construction-debris chute as in claim 12 wherein the ratio of thickness between said impact metal plate and metal plate of the other panels of said offset downstream tube is around 8:3.

14. An offset assembly for a gravity-conveyor chute, said offset assembly receiving material falling along said gravity conveyor chute and causing said material to change direction, said offset assembly comprising:

an offset upstream tube for a gravity-conveyor chute section of a type which can be engaged with other conveyor chute sections to form a gravity conveyor chute, the offset upstream tube comprising a sidewall having basically a tubular shape which guides items falling through a bore thereof, said offset upstream tube having an upstream end opening at an upstream end thereof for receiving items dropped into said offset upstream tube from above and a downstream end opening at a downstream end thereof for discharging said items passing through the bore of said offset upstream tube, said upstream end being engagable with an adjacent section to form said gravity conveyor chute to be longer than said offset upstream tube whereby items serially fall through the bores of said thusly engaged sections;

an offset downstream tube comprising a sidewall having basically a tubular shape which guides items falling through a bore thereof, said offset downstream tube having an upstream end opening at an upstream end thereof for receiving items dropped into said offset downstream tube from above and a downstream end opening at a downstream end thereof for discharging said items passing through the bore of said offset downstream tube;

a hinge means for engaging said upstream end of said offset downstream tube with the down-stream end of said offset upstream tube to align the bores of these two tubes whereby items serially fall through the bores of said thusly engaged upstream and downstream offset tubes while allowing the offset downstream tube to be pivoted relative to the offset upstream tube such that the lateral position of said downstream end opening of the offset downstream tube can be changed relative to the bore of the offset upstream tube, said hinge means being spaced laterally outside of the sidewalls of said offset upstream tube; wherein a portion of the upstream end of said offset downstream tube is substantially bigger in cross-section than a portion of the downstream end of said offset upstream tube so that the angular position of said offset downstream tube can be easily changed relative to said offset upstream tube while the downstream end of said offset upstream tube remains inside the upstream end of said offset downstream tube, with the sidewall of said offset upstream tube overlapping the sidewall of said offset downstream tube a different amount, depending on the angular position of the offset downstream tube; and wherein is further included an attachment means separate from said hinge means for attaching said overlapping sidewalls together at any of a plurality of positions to help support said offset downstream tube from said offset upstream tube with its bore at a selective angle thereto.

15. An offset assembly as in claim 14 wherein said attachment means includes a means for welding said overlapping sidewalls together.

* * * * *